Dec. 4, 1956  H. F. BUDZIEN  2,772,865
ENGINE FUEL SYSTEM
Filed June 15, 1953  2 Sheets-Sheet 1
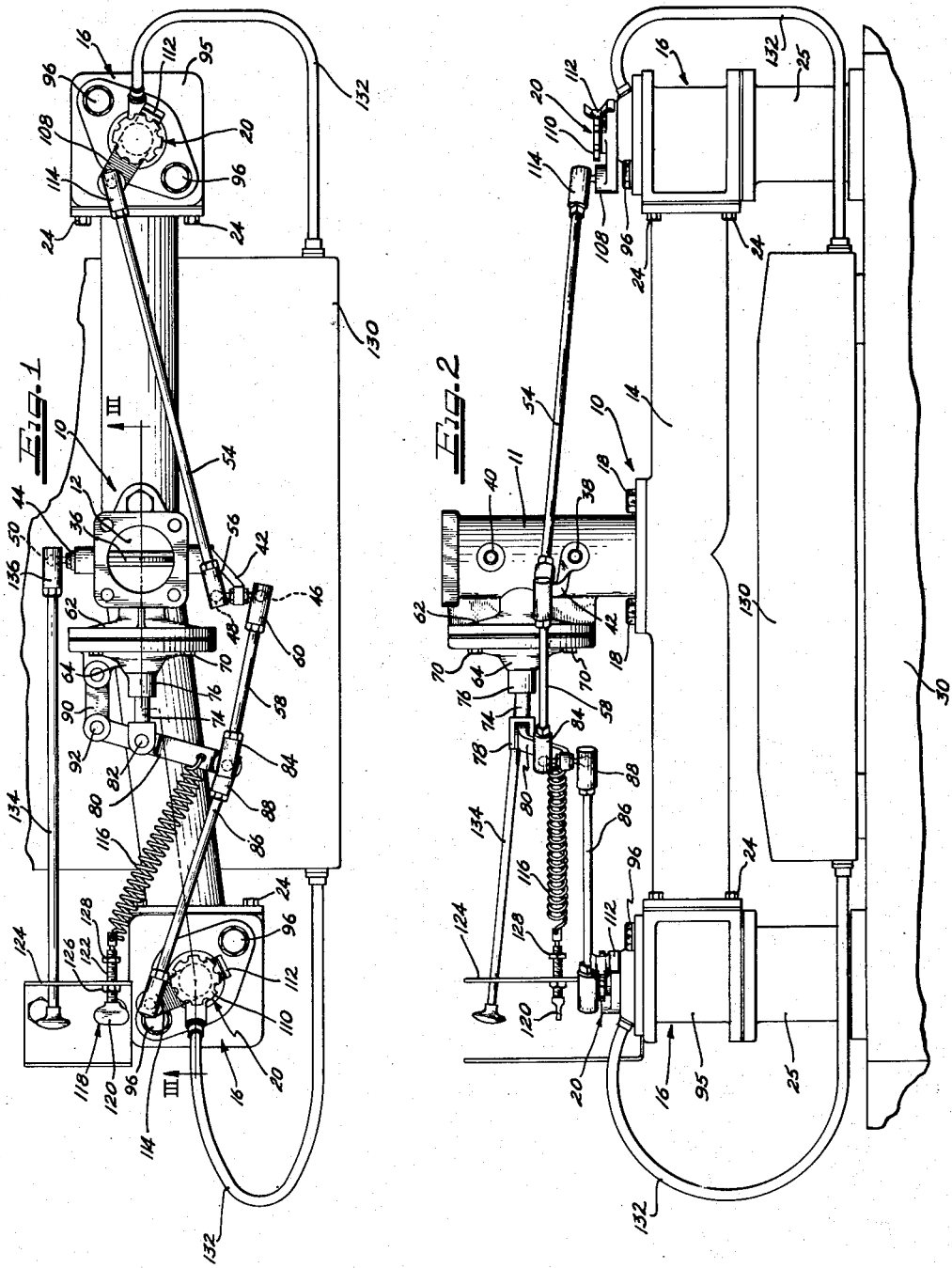
INVENTOR
HUGO F. BUDZIEN
BY
ATTY.

Dec. 4, 1956 H. F. BUDZIEN 2,772,865
ENGINE FUEL SYSTEM
Filed June 15, 1953 2 Sheets-Sheet 2

INVENTOR
Hugo F. Budzien
BY
Paul L. Krohn
ATTY.

United States Patent Office 2,772,865
Patented Dec. 4, 1956

2,772,865
ENGINE FUEL SYSTEM

Hugo F. Budzien, Beloit, Wis., assignor to Fairbanks, Morse & Co., Chicago, Ill., a corporation of Illinois Application June 15, 1953, Serial No. 361,707

4 Claims. (Cl. 261—23)

This invention relates to improvements in fuel systems for internal combustion engines, and more particularly to an improved fuel system for gasoline engines, providing automatic regulation of engine fueling and effecting improved fuel admission to the engine.

The instant invention represents an improvement upon the engine fuel system described and claimed in my copending application Serial No. 270,080, filed February 5, 1952.

In portable and other internal combustion engine power plants wherein the engine affording the power source, is cranked and started by a smaller cranking internal combustion engine, it is important that the cranking engine be adapted for positive and quick starting, and for positive and rapid power output response to variations in cranking and starting conditions imposed by the larger engine. Accordingly, the principal object of the present invention is to provide for such cranking engines, an improved fuel system, including adjustable, automatically actuated fuel control provisions, which is fully operative to assure attainment of the aforementioned cranking engine operating characteristics.

Another object is to provide for cranking engines and particularly such an engine having more than one cylinder, an air supply manifold common to the cylinders and having an atmospheric air intake conduit communicating with the manifold at a point thereof intermediate its length, an air throttle valve in the intake conduit, liquid fuel admission means individual to the engine cylinders and located relatively near the cylinder intake ports, and automatic control means in conjoint control of the air throttle valve and liquid fuel admission means, wherein the control means is operated responsively to and in accordance with pressure variations in the air intake conduit anterior to the air throttle valve therein.

Another object is to provide a fuel and air control arrangement of the character stated in the immediately foregoing object, wherein the air intake conduit of the manifold is provided with a choke valve anterior to the air throttle valve therein, and wherein the automatic control means for the throttle valve and fuel admission means is responsive in the engine starting period when the choke valve may be partially or substantially closed, to pressure variations occurring in the air intake conduit anterior to or on the atmospheric air admission side of the then partly or substantially closed choke valve.

A further important object of this invention is the provision of an engine fuel system embodying fuel control means individual to the engine cylinders and an air delivery and control means common to all cylinders, wherein the several fuel control means and the air control means are effective in response to variations of air pressure in the atmospheric air intake to the manifold, for regulating the admission of fuel and air to the cylinders for determining the volumetric proportioning of these constituents, whereby to automatically adjust the effective fuel mixture in accordance with variations in engine speed and loading.

Another object of this invention is to provide an engine fuel system controlled by a diaphragm means movable in response to changes in air pressure in the atmospheric air intake to the cylinder air supply manifold, and including an adjustable spring mechanism for controlling the action of the pressure movable diaphragm means such as to determine and maintain any desired constant speed operation of the engine.

Another object of the present invention is to provide a fuel system for a multi-cylinder internal combustion engine, wherein air and liquid fuel in atomized condition are mixed in a venturi and mixing zone relatively closely adjacent each cylinder intake port, with the liquid fuel admitted through a fuel metering valve axially aligned with the bore of the venturi and discharging into the air stream at the throat, i. e., point of greatest constriction, of the venturi.

A further object of the invention is to provide an engine fuel system of the character indicated, wherein a single diaphragm device simultaneously controls the fuel and air admitting means for the engine in response to variations in the air pressure within the atmospheric air intake to the air supply manifold.

It is a further object of the invention to provide an engine fuel system which is inexpensive to construct, requires fewer and simpler parts than systems heretofore used, is practically free of mechanical failures and is positive and effective in operation.

These and other objects and advantages will become more readily apparent as the description proceeds and is read in conjunction with the accompanying drawings in which:

Fig. 1 is a plan view of the engine fuel system for a two cylinder gasoline engine;

Fig. 2 is a side elevation view of the engine fuel system;

Figure 3:
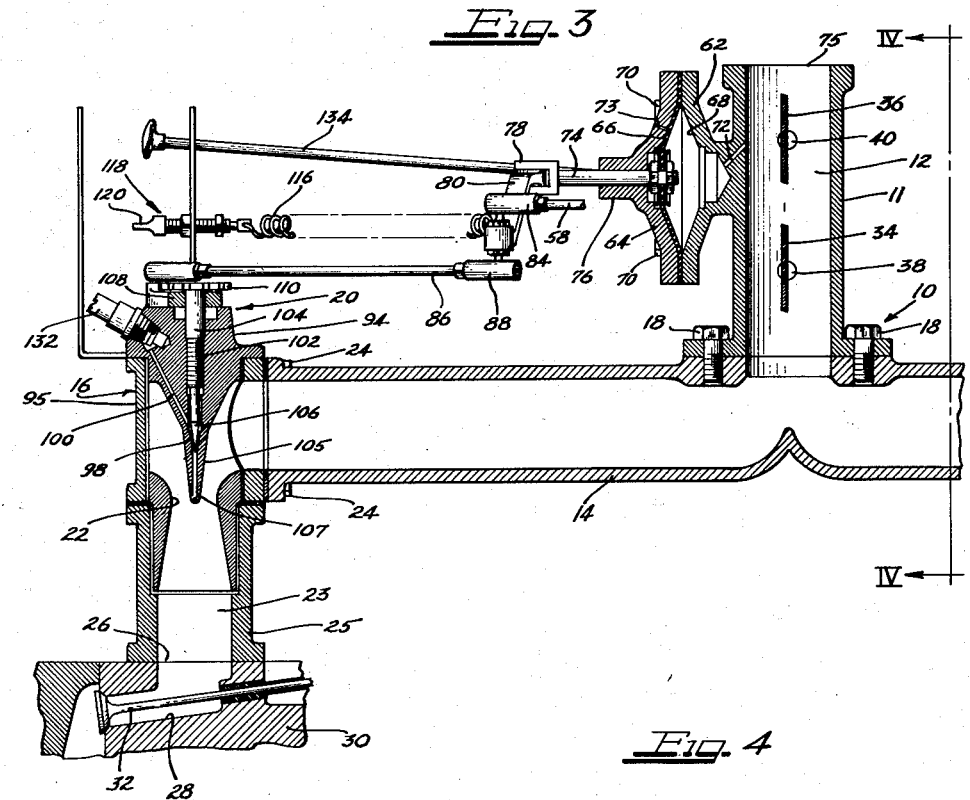
Fig. 3 is a section view, with parts broken away, taken on line 3—3 of Fig. 1, and showing in detail, one half of the essentially symmetrical apparatus.

Generally speaking, the fuel system of the present invention embodies a fuel nozzle and metering valve device individual to each cylinder and disposed relatively closely adjacent the intake port thereof, an air supply conduit means including an air inlet portion containing an air throttle valve which simultaneously controls the admission of air to all cylinders, and a flexible diaphragm device having a control member movable in response to pressure variations occurring in the air inlet portion of the cylinder air supply conduit means on the atmospheric air intake side of the air throttle valve. The fuel valves, control member of the diaphragm device and air throttle valve are normally connected together by an operating linkage, so that the air throttle valve and fuel valves are thereby simultaneously controlled by the pressure in the air intake of the conduit means. A hand regulator is connected to the control linkage through a governing spring, which is variably tensioned according to predetermined positioning of the hand regulator, said spring being so connected in the linkage as to impose a control bias upon the diaphragm. For any given setting of the hand regulator to determine the speed at which the engine will run, the spring will exert a corresponding predetermined force on the diaphragm in one direction, while the pressure within the air intake to the conduit means or manifold tends to move the diaphragm in the other direction. Hence, fuel mixture delivery to the cylinders is regulated in response to pressure variations in the air intake to the manifold to an extent determined by the governor spring tension, which in turn is determined by the hand regulator setting for controlling the speed of operation of the engine.

To facilitate the use of a single diaphragm control device as herein contemplated, and to permit its adaptation for effective operation to properly adjust and control the fuel and air valves in a manner to determine efficient and proper fuel mixture in delivery to the engine cylinders, the diaphragm control is here made responsive to air pressure conditions closely representative of the operating conditions of the engine, occurring at a point in the air supply conduit system wherein the pressure and variations therein reflect the average or mean manifold suction pressures in engine operation. Thus the diaphragm control may be thereby advantageously removed from direct and too rapid response to such instantaneous or short duration fluctuations in manifold suction pressures as normally occur in consequence of alternate cylinder intake operations. It has been found that the air pressure on the atmospheric air intake side of the air throttle valve associated with the air intake to the manifold, is not only sufficiently representative of engine operating conditions, but relatively free of the indicated instantaneous manifold pressure fluctuations. Hence, subjecting the diaphragm control device to such pressures anterior to the air throttle valve, results in an improved stability of diaphragm function such as to assure attainment of proper fuel mixtures in delivery to the engine over its entire operating range.

Particularizing further on the foregoing and with regard to the normal inclusion of a choke valve in the air supply system, as to facilitate engine starting particularly under adverse or cold weather conditions, the present invention while providing for control response of the diaphragm device to the pressure conditions obtaining in the manifold air intake anterior to or on the air inlet side of the air control or throttle valve, affords an advantageous operative relationship between the diaphragm control and the choke valve for assuring stable operation of the diaphragm device during engine starting when the choke valve is partially or substantially closed. The diaphragm control device as herein provided, is adapted to have an operating sensitivity under the bias of the governor spring within the range of adjustment of the latter, sufficient for normal relatively quick-action response to pressure variations in the air intake anterior to the air throttle valve, occurring during engine running usually with the choke valve then in full-open position. With the choke valve located in the manifold air intake anterior to the air throttle valve, and actuated to a partially or fully closed position for engine starting, heavy suction-pressures occur in the air manifold and in the air intake thereof posterior to the closed choke valve during cranking and starting of the engine. Therefore, were the diaphragm device in pressure-responsive communication with the manifold air intake at any point thereof between the air throttle valve and the then closed choke valve, the heavy suction pressures would tend to and in fact, cause actuation of the device toward the extreme of its control range producing closure of the fuel and air throttle valves. Then, with closure of the air throttle valve, the resulting drop in the pressure between the throttle and choke valves would cause an opposite response of the diaphragm device, as to effect reopening of the fuel and air throttle valves. The resulting restoration of heavy suction pressure on the diaphragm, would then cause the latter to repeat closure of the fuel and air throttle valves, and thereupon a reopening of these valves in the cycle indicated. Consequently, the diaphragm control would undergo a cyclic or hunting operation. In order to avoid this result, the diaphragm control device is arranged in suction-pressure communication with the manifold air intake at a point therein which will be on the atmospheric air inlet side of the choke valve when the latter is in closed position. Thus, the control device is thereby removed from direct response to the indicated heavy suction pressures obtaining in engine starting with the choke valve closed.

The fuel system is shown and described as applied to a two cylinder, cranking gasoline engine having its cylinders substantially in axially opposed relation, and wherein the cylinder fuel intake ports are spaced apart an appreciable distance. With such arrangement of the cylinders, the ordinary carburetor in which air and gasoline are mixed prior to delivery to a common intake manifold, has been found to be generally unsatisfactory for the purpose of assuring cylinder delivery of proper fuel mixture necessary for positive and quick starting of cranking engines as herein contemplated. Hence, the fuel system which forms the subject matter of this application, is particularly useful in cranking engines and the like where the cylinders are arranged such that the intake ports are spaced apart an appreciable distance, but is by no means limited to such engines.

In the drawings, the engine fueling system includes an air intake generally designated 10, comprised of an atmospheric air intake conduit 11 providing a valve chamber 12, an air supply conduit or manifold 14, and fuel valve assemblies 16 arranged at each end of the air manifold 14. As best seen in Figs. 2 and 3, conduit 11 is located intermediate the length of manifold 14 preferably at the mid-point thereof, and is connected to the manifold as by means of machine screws 18, such that the chamber 12 communicates with the interior of the manifold.

The fuel valve assemblies are substantially identical, although adapted for right and left hand application as indicated in Fig. 1, and corresponding parts of the assemblies will be similarly designated in the following description. Each assembly includes a fuel metering valve 20 (Fig. 3) and a venturi passage 22 which constitutes part of a relatively short length fuel mixing chamber or passage 23 provided in part by fitting 25 serving to mount the valve assembly on the engine block 30. Valve assemblies 16 are secured to the manifold 14 by means of tap screws 24. The passage of manifold 14 is in communication with each venturi 22, while the lower end 26 of the passage 23 opens into an intake port 28 formed in the cylinder block 30 of the engine. Intake valve 32 is mounted within the cylinder block, and is engine-operated (not shown) for engine-timed admission of the fuel mixture into the associated cylinder.

It will be noted that fuel valve assemblies 16 are disposed immediately above the inlet poppet valves of the engine. Thus the fuel and air will be mixed in venturi 22 and passage 23, and will pass directly to the cylinder without having to traverse any appreciable distance. By this arrangement the fuel mixture is delivered to the cylinder in an intimately mixed condition, with delivery effected directly to the intake port 28 from the short-length mixing chamber or passage 23 so that the atomized and vaporized gasoline has no appreciable opportunity to precipitate or separate from the mixture. This, of course, facilitates the attainment of more perfect combustion in the cylinders, and represents a feature of this invention.

An air throttle valve 34 is mounted within the lower part of chamber 12 and a choke valve 36 is mounted in the upper part of the chamber. The throttle valve is pivotally mounted by means of shaft 38, and the choke valve is pivotally mounted by means of the shaft 40. Both of these valves may be of the butterfly type, and are shown in Fig. 3 in their "wide open" positions.

Figure 4:
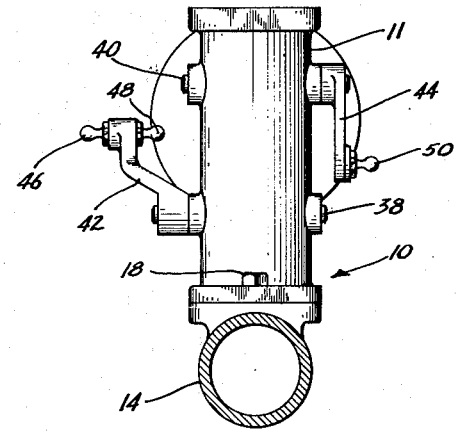
Fig. 4 is a sectional view with parts removed, taken on line 4—4 of Fig. 3.

One end of shaft 38 extends beyond the wall of chamber 12 and has secured thereto a crankarm 42, while the opposite end of shaft 40 extends beyond the chamber and carries another crankarm 44. A ballhead pin 46 (Fig. 4) is carried on one side at the free end of crank 42 and a ballhead pin 48 is carried on the other side thereof. A ballhead pin 50 is carried on the free end of crank 44. Referring to Figs. 1 and 2, it will be seen that a tie rod 54 is connected with crank 42 by means of a socket 56 cooperating with ballhead 48. Another tie rod 58 is connected to crank 42 by means of a socket 60 fitted over ballhead 46. The rod 54 is operatively connected to the fuel metering valve in the right hand valve assembly 16, while tie rod 58 is connected with the fuel metering valve in the left hand valve assembly, as well as with a diaphragm control mechanism now to be explained.

Chamber 12 of the air intake conduit 11 has a disc shaped portion 62 formed integral therewith. A circular concave plate 64 is arranged adjacent to portion 62, with a diaphragm element 66 disposed in a space or cavity 68 formed by the plate and disc shaped portion. The plate 64 is secured to portion 62 by means of machine screws 70, these screws also securing the diaphragm margin in sealed condition between the members 62 and 64. The right hand side of cavity 68 (Fig. 3) communicates with the interior of chamber 12 in the zone of choke valve 36, by means of a passage 72, while the left hand side of the chamber communicates with the atmosphere through a suitable relief port 73. As may be observed in Fig. 3, the passage 72 communicating the diphragm control device with the manifold air intake conduit 11, opens into the chamber or passage 12 of the conduit at a point therein which while definitely anterior to the throttle valve 34, is also anterior or on the air inlet side of the choke valve 36 when the latter is closed. Thus, the diaphragm is subjected to atmospheric pressure on one side, and on the other side to the pressure in the air intake chamber 12 ahead of or anterior to the throttle valve 34 during engine operation and ahead of the choke valve when closed in engine starting. As before noted and as will be hereinafter pointed out, certain important advantages stem from subjecting the control diaphragm to the air pressure conditions obtaining in the indicated region of the conduit 11.

A rod 74 is secured to the diaphragm in a conventional manner so as to slide within a boss 76 formed on plate 64. Rod 74 is bifurcated as indicated at 78, to receive a lever 80 which is pivotally mounted within the bifurcated end of the rod by a pin 82 (Fig. 1). One end of lever 80 is connected to tie rod 58 by means of a ball and socket 84, and the same end of the lever is connected to tie rod 86 by means of a ball and socket connection 88.

The other end of lever 80 is pivotally connected by pin 92, to a link 90 supported by plate 64. With this arrangement the position of the diaphragm and its push rod and, consequently, the position of lever 80, will be dependent upon the pressure-differential between atmospheric pressure on one side of the diaphragm and the pressure on the opposite side of the diaphragm consequent to the pressure condition obtaining in air intake conduit 11 anterior to the air throttle valve 34 therein, with diaphragm response to such pressure-differential regulated by a suitable governing spring as hereinafter described. Movement of lever 80 will cause throttle valve 34 to be operated through tie rod 58 and crank 42. As will be hereinafter explained, movement of link 80 will also cause the fuel valves to be operated.

As best seen in Fig. 3, fuel valve 20 is a needle valve which controls the admission of fuel to the throat of venturi 22. Valve 20 includes a body member 94 mounted in a housing 95 by means of machine screws 96 (Figs. 1 and 2). Member 94 has a central bore having a frustoconical valve seat 98, a fuel delivery passage 100 and a threaded bore 102. A valve stem 104 is threaded into bore 102 and carries a needle valve 106, which cooperates with valve seat 98. When stem 104 is threaded into member 94, the valve is closed to limit the passage of fuel from fuel passage 100 past seat 98, and hence, into venturi 22. Correspondingly, when stem 104 is threaded out of bore 102, the valve is opened.

An important feature of this invention resides in the relative positioning of valve 20 and venturi 22. As best seen in Fig. 3, the body member 94 has a nozzle 105 extending from valve seat 98 to the throat of venturi 22, which nozzle is provided with a fuel passage 107. Thus fuel will flow between needle valve 106 and valve seat 98, through passage 107, and be discharged from nozzle 105 substantially axially into the throat of venturi 22. Due to the restriction of the venturi, a high air velocity exists at the throat thereof, and liquid fuel will be thereby withdrawn from nozzle 105 by atomizer action, to completely vaporize the liquid fuel and thoroughly mix the vapor and air.

It is particularly important to note that the nozzle 105 is axially aligned with the venturi. With this arrangement the air flow through the venturi is not unduly impeded, because of the smooth flow lines offered by nozzle 105 and the sides of venturi 22. Furthermore, it has been found that with this arrangement, erratic turbulence is avoided in the air flow through the venturi, so that homogeneous fuel mixtures are attained such as to facilitate highly efficient fuel combustion in the engine cylinders.

A lever 108 is mounted for free rotation on the upper end of stem 104, and a notched wheel or indexing knob 110 is secured to the upper end of the stem above lever 108. Lever 108 carries a spring clip 112 (Figs. 1 and 2), which releasably engages notched wheel 110. At the end of lever 108 opposite spring clip 112, a ball and socket connection 114 secures the lever to the associated one of said tie rods 54 and 86.

Spring clips 112 normally connect levers 108 to the valve stems 104. Thus, when tie rods 54 and 86 are moved to the right as viewed in Fig. 1, the right hand and left hand needle valves will be moved toward closed position, and when these tie rods are moved to the left, the valves will be moved in the valve opening direction. In order that the needle valves may be adjusted independently of the linkage system, which includes tie rods 54 and 86, spring clips 112 may be manually disengaged from the notched wheels 108 and the valve stem rotated by hand. By this adjustment, the fuel valves may be set in corresponding positions.

From the foregoing description it should be evident that the positioning of throttle valve 34 and fuel valves 20 is, in normal operation, under control of the pressure in the air intake conduit as it influences the positioning of diaphragm 66. That is, if the pressure within air valve chamber 12 decreases, the rod 74 connected with diaphragm 66 is moved into plate 64 so as to move tie rods 54, 58, and 86 in a direction to close fuel valves 20 and to close throttle valve 34. Likewise, if the pressure increases, the diaphragm causes valve actuation in the opening direction.

An important feature of this invention is the provision of an automatic speed governing control for the engine. A governing spring 116 is connected between lever 80 and a hand control 118. Control 118 has a winged head 120, and a threaded shank 122, which is threadedly received within a control mounting plate 124. A nut 126 is threaded over shank 122 and disposed on the forward side of plate 124, while another nut 128, carried by shank 122, is disposed on the other side of the plate. Nut 128 serves to limit the extent that hand control 118 may be threaded out of plate 124 so as to limit the maximum amount of tension that may be created within governing spring 116. Thus, the disposition of nut 128 controls the idling position of the air and fuel valves. Nut 126 serves to limit the extent that the hand control may be threaded into plate 124, and thereby serves as a stop when the engine is at full throttle.

Gasoline is supplied to fuel valves 20 from a tank 130 through tubes 132 (Figs. 1 and 2). The fuel tank is disposed below the manifold 14 on cylinder block 30 of the engine. With this arrangement, fuel flows to the fuel valves only when a vacuum condition exists adjacent nozzle 105 within each venturi 22, and therefore the engine can not become flooded when it is not in operation.

As best seen in Fig. 1, a choke lever 134 is slidably mounted within control mounting plate 124, and has one end connected to ballhead 50 of crank 44, as through a socket 136. The butterfly choke valve 36 may be closed or partially closed, as at starting particularly in cold weather, to provide a rich fuel mixture for the engine, by pulling the choke lever to the left as viewed in Figs. 1 and 2. During normal operation, the choke valve 36 will, of course, be maintained in a wide open position, i. e., the position shown in Fig. 3.

Describing now the operation of the fuel system, it should be appreciated that when the engine is not running, only the force of spring 116 will be exerted on the linkage system, so that the valves will all be open since no reduced pressure then exists in the intake conduit of the manifold to oppose the spring force. In starting the engine, the hand control 118 is positioned relative to plate 124, such as to determine spring-loading of the fuel control system say for an engine-idling condition. With the hand control so disposed, the choke lever 134 may be operated to close choke valve 36 and the engine cranked or turned over in any convenient manner to start the engine. Since the passage 72 is open to chamber 12 on the air inlet side of the now closed choke valve 36, the diaphragm control will respond to the air-pressure conditions obtaining ahead of the choke valve, such as to establish and maintain the spring-set idling condition of engine fueling once the engine starts upon cranking. Thus the control is removed from the heavy suction pressures posterior to the closed choke valve as hereinbefore explained, whereby to avoid the disadvantageous effects including hunting operation of the control as before described.

As soon as the engine is in operation, the choke is gradually released until the engine runs evenly, and the hand control 118 then may be set to run the engine at the desired or required cranking speed. Since the right hand side of the diaphragm chamber 68 (Fig. 3) communicates with the air valve chamber 12 at the point indicated, the diaphragm 66 will be subjected to the pressure condition in the portion of the air inlet chamber 12 anterior to the air throttle valve 34, resulting in a pressure differential on the diaphragm tending to cause diaphragm movement to the right as viewed in Fig. 3, against the bias of governor spring 116. Thus under steady state operating conditions, the diaphragm 66 will assume a position such that the force exerted by the pressure differential existing between opposite sides of the diaphragm, is equal to the force exerted on the diaphragm by governing spring 116.

Assuming the engine is running at a constant speed with the hand control set at its full engine speed position, the diaphragm 66 will assume a position in the left hand side of diaphragm chamber 68 as viewed in Fig. 3. Thus tie rods 54, 58, and 86 will be moved by lever 80 to positions opening air throttle valve 34 and fuel valves 20 to a maximum amount, the amount which the fuel valves are opened being dependent upon the relative positions of engagement between spring clips 112 of levers 108 and notched wheels 110. If the engine is operated at a steady idling speed or any other slow speed as determined by the setting of hand control 118, the diaphragm will be disposed in the right hand side of chamber 68 as viewed in Figs. 1, 2, and 3. In this position, the diaphragm will have moved tie rods 54, 58, and 86 so that fuel valves 20 and air throttle valve 34 are in relatively closed positions.

Describing now the governing action of the fuel system, upon a change in pressure in the air intake conduit of manifold 14 and anterior to air valve 34 therein, the diaphragm 66 will assume a position in response thereto, such that the forces acting on the diaphragm will be in balance. Thus, with the engine running at a given speed determined by the setting of the hand control, if the engine loading is increased the speed will tend to decrease, with the result that the pressure in air intake conduit 11 effective on the diaphragm 66, then will change correspondingly and such as to permit the governor spring 116 to cause diaphragm retraction and consequent movement of lever 80 clockwise as viewed in Fig. 1, to effect further opening of the fuel and air valves. The resultant increased fuel mixture delivery then will cause the engine to resume its former speed of operation. If the engine is operating at a given speed and the load is removed or reduced so that the speed tends to increase, the pressure within housing 12 changes in the opposite sense, thereby to cause movement of lever 80 in a counterclockwise direction as viewed in Fig. 1. This movement of lever 80 produces actuation of fuel valves 20 and throttle valve 34 to reduce the quantity of fuel mixture supplied to the engine. Thus, under the new load condition, the engine re-assumes the constant speed of operation as set by the hand control 118. It should be appreciated that the above mentioned governing action is very quick in response to speed changes, and while the governing action has been described as a step by step process, for all practical purposes the steps are substantially simultaneous.

For efficient operation of an internal combustion engine and particularly the cranking engine herein contemplated, it is important that the fuel mixture be varied only in accordance with the requirements of the engine under different speed and load conditions. By subjecting diaphragm 66 to the pressure within valve housing 12 ahead of the air throttle valve and near the air intake port 75 of the conduit 11, the diaphragm will be subjected to a relatively constant force for a given engine speed. In other words, the pressure in housing 12 is substantially constant when the engine is running at any given speed, whereas, the pressure in other regions of the intake manifold such as in venturis 22, is fluctuating. The fluctuation of pressure in the venturis and in the manifold 14 is caused by the intermittant opening and closing of poppet valves 32. When the poppet valve is open and a fuel mixture is being drawn into the cylinder, a certain pressure exists in the venturi associated therewith, and when the poppet valve is closed, the pressure in the venturi will be of a different magnitude. The two cylinder engine shown in the drawings may operate so that the poppet valve associated with the left hand cylinder is open when the poppet valve associated with the right hand cylinder is closed, and vice versa, so that the pressure in the venturis may be instantaneously different. However, the pressure reflected in housing 12 anterior to the air valve 34 will be of a relatively constant magnitude for a given engine speed, and the force exerted by the pressure differential across the diaphragm 66 then will be substantially constant. Hence, only an actual change in speed of operation of the engine as produced by load change or change in other operating conditions, will cause sufficient unbalance of forces on the diaphragm to change the settings of the fuel and air valves. Consequently, the valves will not be continuously repositioned by pressure fluctuations that are not representative of engine operating conditions as reflected in engine speed.

Having now described one form of my invention, it should be readily apparent that the engine fuel system automatically adjusts the supply of fuel to the engine to provide an efficient fuel mixture and constant speed operation. The fuel system also assures delivery of a proper fuel and air mixture to the cylinders, since the mixing of the fuel constituents is effected in the chamber relatively close to the intake passage of the cylinder, by the novel arrangement of the fuel valve and venturi. Furthermore, the system is relatively simple and the working parts, including the pressure actuated diaphragm, are not subjected to unnecessary adjustment by pressure fluctuations.

The foregoing specification contains a complete description of one form of my invention as required by 35 USC 112, but it should be appreciated that various changes, modifications, and permutations may be effected without departing from the scope of the appended claims.

I claim:

1. In a fuel system for a multi-cylinder engine having an inlet port for each cylinder, an air intake manifold including an air intake passage in communication with the atmosphere and having spaced openings in communication with said inlet ports, fuel valves disposed adjacent said inlet ports, a throttle valve for said air intake passage of said manifold, a linkage connecting said valves for conjoint operation, a member connected to said linkage and exerting a biasing force thereon in a direction to open said valves, a diaphragm connected to said linkage and subjected to the pressure in said air intake passage on the intake side of said throttle valve, normally effective to exert a force on said linkage system in a direction to closed said valves, and means to vary the amount of biasing force applied to said linkage by said member.

2. In a fuel system for an internal combustion engine providing at least two cylinders each having a fuel inlet, means adjacent the fuel inlet of each cylinder providing a fuel and air mixing chamber, means including a fuel valve at each mixing chamber for the admission of fuel thereto, an air supply conduit common to said mixing chambers and having an air inlet portion intermediate the conduit length, an air throttle valve in said inlet portion, a choke valve in the inlet portion anterior to the throttle valve therein, linkage means interconnecting said fuel valves and air throttle valve for conjoint actuation, adjustable spring means connected to said linkage means and effective therethrough to bias said fuel and air throttle valves to open positions, and a control device responsive to air pressure in said inlet portion of the air supply conduit at a point therein which is anterior to the choke valve in the closed position of the latter, said control device being connected to said linkage means and effective therethrough in opposition to said spring means, to determine control positions of the air throttle valve and fuel valves in accordance with variations in the air pressure at said point in the conduit air inlet portion.

3. In a fuel control system for an internal combustion engine providing at least two cylinders each having a fuel inlet, means adjacent the fuel inlet of each cylinder providing a fuel and air mixing chamber, fuel admission means including a fuel control valve for each mixing chamber, an air supply conduit common to the mixing chambers and having an air inlet portion, an air throttle valve in said inlet portion, a choke valve in the inlet portion anterior to the throttle valve, linkage means interconnecting said air throttle and fuel control valves for conjoint actuation, a spring connected at one end to said linkage means, means supporting the other end of the spring, said spring acting through said linkage means tending to dispose said air throttle and fuel control valve in open positions, and a pressure operated device responsive to air pressure in said inlet portion at a point therein which is anterior to the choke valve in the closed position of the latter, said device being connected to said linkage means and effective therethrough in opposition to said spring, to determine control positions of the air throttle and fuel control valves in accordance with variations in the air pressure at said point in the conduit air inlet portion.

4. In a speed-settable, constant speed internal combustion engine, having at least two cylinders each having a fuel inlet, a fule system therefor comprising means adjacent each cylinder fuel inlet forming a fuel and air mixing chamber, fuel admission means for each mixing chamber including a fuel valve, an air supply conduit common to said mixing chambers and having an air inlet portion, an air throttle valve in said inlet portion, linkage means interconnecting said air throttle valve and fuel valves for conjoint actuation, a pressure operated device connected to said linkage means and operable in response to air pressure variations in said inlet portion anterior to the air throttle valve therein, for actuating said air throttle and fuel valves, a tension spring connected to said linkage means and effective therethrough in opposition to said pressure operated device, to bias said air throttle and fuel valves toward full open positions thereof and to determine the extent of pressure responsive operation of said pressure operated device, and means for adjusting the tension of said spring whereby to alter the extent of pressure responsive operation of said pressure operated device.

References Cited in the file of this patent

UNITED STATES PATENTS

| 1,901,849 | Moore | Mar. 14, 1933 |
| 2,134,889 | Phillips | Nov. 1, 1938 |
| 2,293,842 | Mallory | Aug. 25, 1942 |
| 2,428,377 | Morris | Oct. 7, 1947 |
| 2,562,656 | Blakeslee | July 31, 1951 |
| 2,595,720 | Snyder | May 6, 1952 |
| 2,595,721 | Snyder | May 6, 1952 |

FOREIGN PATENTS

| 556,726 | France | Apr. 19, 1923 |